United States Patent
Rost et al.

(10) Patent No.: US 12,301,464 B2
(45) Date of Patent: May 13, 2025

(54) APPARATUS, METHOD AND COMPUTER PROGRAM

(71) Applicant: NOKIA TECHNOLOGIES OY, Espoo (FI)

(72) Inventors: Peter Rost, Heidelberg (DE); Borislava Gajic, Unterhaching (DE); Christian Mannweiler, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 89 days.

(21) Appl. No.: 17/617,060

(22) PCT Filed: Jun. 14, 2019

(86) PCT No.: PCT/EP2019/065714
§ 371 (c)(1),
(2) Date: Dec. 7, 2021

(87) PCT Pub. No.: WO2020/249230
PCT Pub. Date: Dec. 17, 2020

(65) Prior Publication Data
US 2022/0321485 A1     Oct. 6, 2022

(51) Int. Cl.
*H04L 47/2416*     (2022.01)
*H04L 12/46*        (2006.01)
(Continued)

(52) U.S. Cl.
CPC ...... *H04L 47/2416* (2013.01); *H04L 12/4641* (2013.01); *H04L 47/2425* (2013.01); *H04L 47/562* (2013.01)

(58) Field of Classification Search
CPC ............. H04L 47/2416; H04L 12/4641; H04L 47/2425; H04L 47/562; H04L 47/56; H04L 47/801; H04W 28/0263
See application file for complete search history.

(56) References Cited

U.S. PATENT DOCUMENTS

2004/0190454 A1* 9/2004 Higasiyama ............ H04L 45/48
                                                                370/221
2019/0132251 A1  5/2019 Dao et al.
(Continued)

FOREIGN PATENT DOCUMENTS

WO    WO 2016/202377 A1   12/2016
WO    WO 2019/035406 A1    2/2019
WO    WO-2021204505 A1 * 10/2021 ......... H04L 47/2491

OTHER PUBLICATIONS

Wikipedia: IEEE 802.1D. https://en.wikipedia.org/w/index.php?title=IEEE_802.1D&oldid=1079381802. pp. 1-2.
(Continued)

*Primary Examiner* — Farzana B Huq
(74) *Attorney, Agent, or Firm* — SQUIRE PATTON BOGGS (US) LLP

(57) ABSTRACT

An apparatus (113) comprising means for performing: receiving one or more forwarding tables from a centralized network configuration entity (101) of a time sensitive network, wherein the forwarding tables comprise entry information; and determining, based at least in part on the one or more forwarding tables, rules for mapping at least one uplink data stream of the time sensitive network to at least one of: a protocol data unit session (135, 137) and a quality of service flow (129, 131, 133).

12 Claims, 7 Drawing Sheets

(51) Int. Cl.
*H04L 47/2425* (2022.01)
*H04L 47/56* (2022.01)

(56) References Cited

U.S. PATENT DOCUMENTS

| | | | |
|---|---|---|---|
| 2020/0137615 A1* | 4/2020 | Joseph | H04W 24/02 |
| 2020/0154304 A1* | 5/2020 | Cho | H04W 28/0268 |
| 2021/0219357 A1* | 7/2021 | Talebi Fard | H04W 48/16 |
| 2022/0256393 A1* | 8/2022 | Zhang | H04W 28/0263 |

OTHER PUBLICATIONS

Wikipedia: IEEE 802.1Q. https://en.wikipedia.org/w/index.php?title=IEEE_802.1Q&oldid=1096583479. pp. 1-5.

International Search Report and Written Opinion dated Nov. 27, 2019 corresponding to International Patent Application No. PCT/EP2019/065714.

E. Decker et al., "Definitions of Managed Objects for Bridges," Network Working Group, RFC 1493, Jul. 1993.

* cited by examiner

APPARATUS, METHOD AND COMPUTER PROGRAM

FIELD

This disclosure relates to communications networks. More particularly, the present disclosure relates to an apparatus, method and computer program for determining mapping rules in a communication system.

BACKGROUND

Mapping rules can be used at a User Equipment (UE) to map one flow of data to another flow of data.

In some situations, wired networks and wireless networks may be integrated. A wired network may comprise a Time Sensitive Network (TSN). A wireless network may comprise a $3^{rd}$ Generation Partnership Project (3GPP) Fifth Generation (5G) network, for example. Industrial Internet of Things (IIoT) networks or Industry 4.0 networks may comprise integrated wired and wireless networks.

STATEMENT OF INVENTION

According to a first aspect there is provided an apparatus comprising means for performing: receiving one or more forwarding tables from a centralized network configuration entity of a time sensitive network, wherein the forwarding tables comprise entry information; determining, based at least in part on the one or more forwarding tables, rules for mapping at least one uplink data stream of the time sensitive network to at least one of: a protocol data unit session and a quality of service flow.

According to some examples, the time sensitive network comprises a time sensitive network bridge, the time sensitive network bridge comprising at least one ingress network port and at least one egress network port, and wherein the entry information comprises a destination medium access control address and a corresponding ingress port and egress port pair.

According to some examples, the entry information comprises a virtual local area network identifier.

According to some examples, determining the rules for mapping comprises determining, using the entry information, a protocol data unit session to map the uplink data stream to.

According to some examples, determining the rules for mapping comprises determining a quality of service flow to map the uplink data stream to by using the entry information and at least one priority code point value received in at least one header of at least one data stream.

According to some examples, the at least one data stream comprises a time sensitive network stream.

According to some examples, the at least one uplink data stream comprises a time sensitive network stream.

According to some examples, the means are further configured to perform: sending the mapping rules to a user equipment such that the user equipment can use the mapping rules.

According to some examples, the means are further configured to perform: sending the mapping rules to one or more user plane functions in the network.

According to some examples, the means are further configured to perform: determining to insert or remove an uplink classifier and/or branching point for a protocol data unit session based at least in part on the entry information of the one or more forwarding tables; wherein the insertion or removal of the uplink classifier and/or the branching point causes network traffic at the user equipment to be forwarded via one or more user plane functions that are not visible to the time sensitive network.

According to some examples, the determining to insert or remove an uplink classifier and/or branching point for a protocol data unit session is further based at least in part on the entry information of the one or more forwarding tables and connectivity information regarding user plane functions that are not visible to the time sensitive network.

According to some examples, the apparatus comprises a session management function.

According to some examples, the apparatus is part of a mobile communication system that behaves as a time sensitive network bridge towards other entities in the time sensitive network.

According to a second aspect there is provided an apparatus comprising at least one processor; and at least one memory including computer program code; the at least one memory and the computer program code configured to, with the at least one processor, cause the apparatus at least to perform: receiving one or more forwarding tables from a centralized network configuration entity of a time sensitive network, wherein the forwarding tables comprise entry information; determining, based at least in part on the one or more forwarding tables, rules for mapping at least one uplink data stream of the time sensitive network to at least one of: a protocol data unit session and a quality of service flow.

According to some examples, the time sensitive network comprises a time sensitive network bridge, the time sensitive network bridge comprising at least one ingress network port and at least one egress network port, and wherein the entry information comprises a destination medium access control address and a corresponding ingress port and egress port pair.

According to some examples, the entry information comprises a virtual local area network identifier.

According to some examples, determining the rules for mapping comprises determining, using the entry information, a protocol data unit session to map the uplink data stream to.

According to some examples, determining the rules for mapping comprises determining a quality of service flow to map the uplink data stream to by using the entry information and at least one priority code point value received in at least one header of at least one data stream.

According to some examples, the at least one data stream comprises a time sensitive network stream.

According to some examples, the at least one uplink data stream comprises a time sensitive network stream.

According to some examples, the at least one memory and the computer program code are configured to, with the at least one processor, cause the apparatus at least to perform: sending the mapping rules to a user equipment such that the user equipment can use the mapping rules.

According to some examples, the at least one memory and the computer program code are configured to, with the at least one processor, cause the apparatus at least to perform: sending the mapping rules to one or more user plane functions in the network.

According to some examples, the at least one memory and the computer program code are configured to, with the at least one processor, cause the apparatus at least to perform: determining to insert or remove an uplink classifier and/or branching point for a protocol data unit session based at least in part on the entry information of the one or more forwarding tables; wherein the insertion or removal of the uplink classifier and/or the branching point causes network traffic at the user equipment to be forwarded via one or more user plane functions that are not visible to the time sensitive network.

According to some examples, the determining to insert or remove an uplink classifier and/or branching point for a protocol data unit session is further based at least in part on the entry information of the one or more forwarding tables and connectivity information regarding user plane functions that are not visible to the time sensitive network.

According to some examples, the apparatus comprises a session management function.

According to some examples, the apparatus is part of a mobile communication system that behaves as a time sensitive network bridge towards other entities in the time sensitive network.

According to a third aspect there is provided an apparatus comprising: circuitry for receiving one or more forwarding tables from a centralized network configuration entity of a time sensitive network, wherein the forwarding tables comprise entry information; and circuitry for determining, based at least in part on the one or more forwarding tables, rules for mapping at least one uplink data stream of the time sensitive network to at least one of: a protocol data unit session and a quality of service flow.

According to a fourth aspect there is provided a method comprising: receiving one or more forwarding tables from a centralized network configuration entity of a time sensitive network, wherein the forwarding tables comprise entry information; and determining, based at least in part on the one or more forwarding tables, rules for mapping at least one uplink data stream of the time sensitive network to at least one of: a protocol data unit session and a quality of service flow.

According to some examples, the time sensitive network comprises a time sensitive network bridge, the time sensitive network bridge comprising at least one ingress network port and at least one egress network port, and wherein the entry information comprises a destination medium access control address and a corresponding ingress port and egress port pair.

According to some examples, the entry information comprises a virtual local area network identifier.

According to some examples, determining the rules for mapping comprises determining, using the entry information, a protocol data unit session to map the uplink data stream to.

According to some examples, determining the rules for mapping comprises determining a quality of service flow to map the uplink data stream to by using the entry information and at least one priority code point value received in at least one header of at least one data stream.

According to some examples, the at least one data stream comprises a time sensitive network stream.

According to some examples, the at least one uplink data stream comprises a time sensitive network stream.

According to some examples, the method comprises: sending the mapping rules to a user equipment such that the user equipment can use the mapping rules.

According to some examples, the method comprises: sending the mapping rules to one or more user plane functions in the network.

According to some examples, the method comprises: determining to insert or remove an uplink classifier and/or branching point for a protocol data unit session based at least in part on the entry information of the one or more forwarding tables; wherein the insertion or removal of the uplink classifier and/or the branching point causes network traffic at the user equipment to be forwarded via one or more user plane functions that are not visible to the time sensitive network.

According to some examples, the determining to insert or remove an uplink classifier and/or branching point for a protocol data unit session is further based at least in part on the entry information of the one or more forwarding tables and connectivity information regarding user plane functions that are not visible to the time sensitive network.

According to some examples, the method is performed by a session management function.

According to some examples, the method is performed by an apparatus which is part of a mobile communication system that behaves as a time sensitive network bridge towards other entities in the time sensitive network.

According to a fifth aspect there is provided a computer program comprising instructions for causing an apparatus to perform at least the following: receiving one or more forwarding tables from a centralized network configuration entity of a time sensitive network, wherein the forwarding tables comprise entry information; and determining, based at least in part on the one or more forwarding tables, rules for mapping at least one uplink data stream of the time sensitive network to at least one of: a protocol data unit session and a quality of service flow.

According to a sixth aspect there is provided a computer program comprising instructions stored thereon for performing at least the following: receiving one or more forwarding tables from a centralized network configuration entity of a time sensitive network, wherein the forwarding tables comprise entry information; and determining, based at least in part on the one or more forwarding tables, rules for mapping at least one uplink data stream of the time sensitive network to at least one of: a protocol data unit session and a quality of service flow.

According to a seventh aspect there is provided a non-transitory computer readable medium comprising program instructions for causing an apparatus to perform at least the following: receiving one or more forwarding tables from a centralized network configuration entity of a time sensitive network, wherein the forwarding tables comprise entry information; and determining, based at least in part on the one or more forwarding tables, rules for mapping at least one uplink data stream of the time sensitive network to at least one of: a protocol data unit session and a quality of service flow.

According to an eighth aspect there is provided a non-transitory computer readable medium comprising program instructions stored thereon for performing at least the following: receiving one or more forwarding tables from a centralized network configuration entity of a time sensitive network, wherein the forwarding tables comprise entry information; and determining, based at least in part on the one or more forwarding tables, rules for mapping at least one uplink data stream of the time sensitive network to at least one of: a protocol data unit session and a quality of service flow.

BRIEF DESCRIPTION OF FIGURES

The invention will now be described in further detail, by way of example only, with reference to the following examples and accompanying drawings, in which.

DETAILED DESCRIPTION

Figure 1:
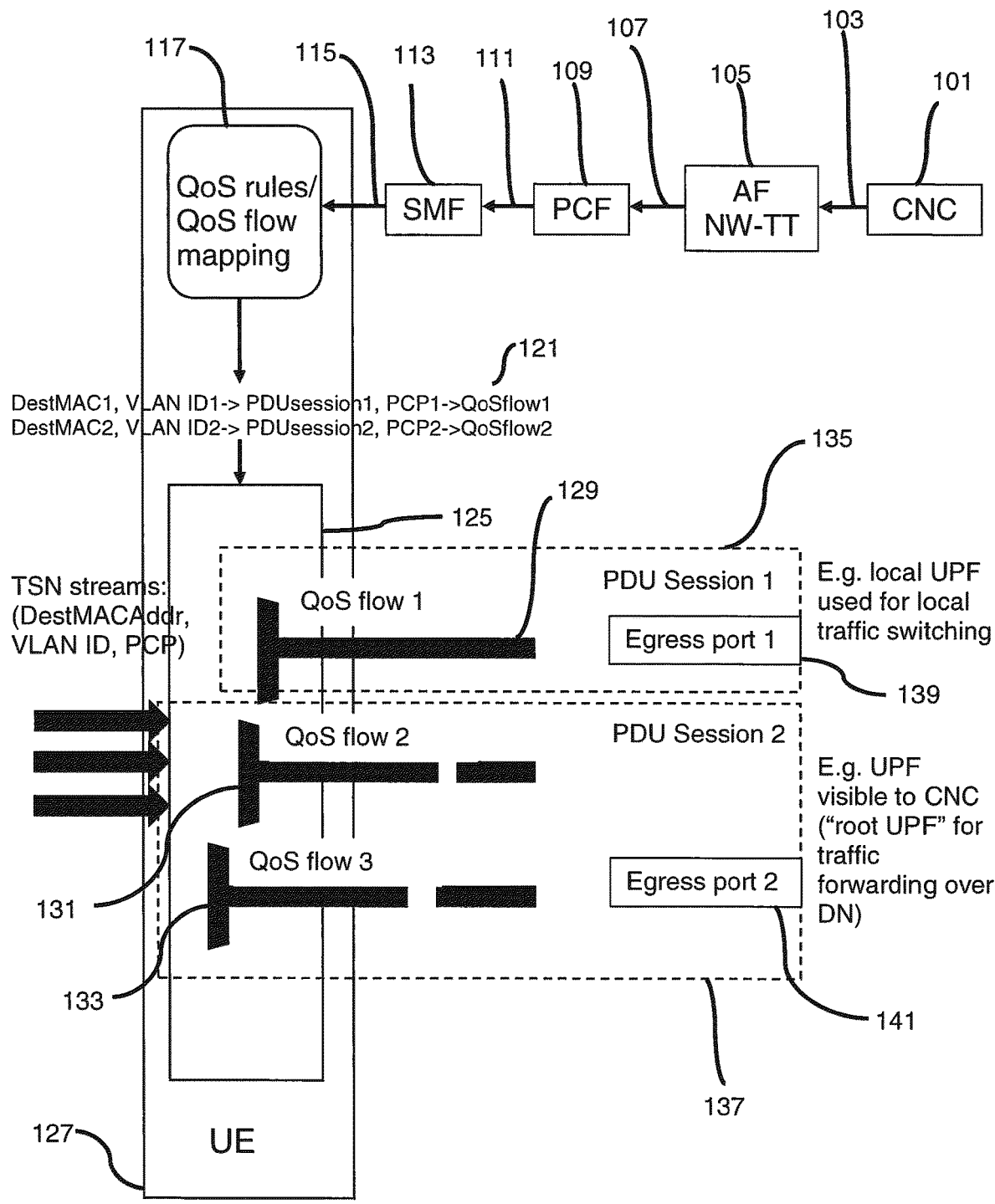
FIG. 1 shows a schematic representation of a method for mapping streams of data.

The present disclosure relates to mapping uplink streams of data at a user equipment. An uplink direction may be considered to be, for example, from a UE towards a Radio Access Network (RAN). A downlink direction may be considered to be from a RAN towards a UE.

In some networks such as, for example, a tactile industrial network, which may comprise an IIoT network or Industry 4.0 network, 3GPP technologies may be applied in addition to wired Time Sensitive Networking (TSN).

Tactile industrial networks can be used to provide flexibility (in terms of mobility) and scalability (in terms of a number of sensors or actuators). This can be useful in, for example, industrial environments.

3rd Generation Partnership Project; Technical Specification Group Services and System Aspects; Study on enhancement of 5G System (5GS) for vertical and Local Area Network (LAN) services describes a bridge model (black box) option for integration of 3GPP networks with TSN. In order to appear as a bridge, a 3GPP system, which may comprise a Fifth Generation System (5GS) can incorporate one or more TSN translator functions at the network and UE side. In such a model, the TSN network considers the 5GS as a TSN bridge within the TSN network.

In terms of bridge granularity in a network, in some examples a single virtual bridge including all UEs and User Plane Functions (UPFs) may be provided. In other examples, a 5G virtual bridge may be provided per UE or per Protocol Data Unit session.

In some examples, it may be useful to provide a 5G virtual bridge for each UPF in a network such that the bridge granularity is a single UPF granularity. In other words, the bridge granularity is per UPF. In such an example, the 5GS may be partitioned according to UPF deployments in the network such that the 5GS can be represented towards the TSN as separate bridges with a single UPF granularity. The network may be, for example, a tactile industrial network.

When providing a 5G virtual bridge for each UPF in a network, if there is a change in UPF setup comprising a change in the number of instantiated UPF instances, the 5GS can create one or more additional bridges by reporting such changes to the TSN system.

According to some examples, a "local UPF" may be considered to be UPF instances that do not offer any TSN bridge ports which are visible to a Centralized Network Configuration (CNC) entity towards a Data Network (DN). When referring to a CNC in the following, this may be considered to be referring to either a CNC entity or the whole CNC.

According to some examples a "root UPF" may be considered to be UPF instances that offer TSN bridge ports visible to the CNC.

In some examples, the bridge granularity is per root UPF.

Static Filtering Entries provided by the CNC towards TSN bridges in a network can be used to describe rules for traffic forwarding. The Static Filtering Entries comprise information about the ingress and egress ports from/to which the streams with specific destination MAC addresses and VLAN tags need to be forwarded. Static Filtering Entities may comprise forwarding tables.

IETF, RFC 1493, "Definitions of Managed Objects for Bridges" describes Management Information Bases (MIBs) for managing Medium Access Control (MAC) bridges based on the IEEE 802.1D specification, which also builds the basis for IEEE 802.1Q specification applied in TSN networks.

Before a bridge can be operational in a network, a CNC in the network sets up at least one forwarding table to ensure that unicast and/or multicast frames are forwarded correctly. Examples of such forwarding tables are, for example, the ieee8021QBridgeStaticMulticastTable and ieee8021QBridgeStaticUnicastTable described in the IEEE 802.1Q specification.

Forwarding tables may comprise entry information. Entry information may comprise a destination MAC address to which an entry's filtering information applies, an ingress port, one or more egress port(s), and a VLAN ID. Entry information may be associated with an entry (instance) in a forwarding table.

An ingress port entry may be considered to be a port from which a frame is to be received in order for the entry's filtering information to apply. A value of zero for an ingress port indicates that the entry applies on all ports of the device for which there is no other applicable entry.

The one or more egress port(s) may be considered to be the port or set of ports to which frames received from a particular ingress port and destined for a specific MAC address will be forwarded.

A VLAN ID may be considered to provide filtering and classification information for ports, i.e. information of whether frames of a specific TSN stream should be forwarded via a specific port.

FIG. 1 shows an example of how mapping rules between TSN streams and PDU sessions can be derived. FIG. 1 also shows an example of how mapping rules between TSN streams and QoS (Quality of Service) flows can be derived.

At 103, CNC entity 101 sends one or more forwarding tables to Application Function/Network Side Translation Function (AF/NW-TT) 105.

In some examples, when AF/NW-TT 105 receives the forwarding tables, AF/NW-TT 105 can adapt the information from the forwarding tables to 3GPP-specific information. For example, the information on ingress and egress port pairs in the forwarding table can be adapted to PDU session IDs. This can be useful in cases where SMF 113 is agnostic to (i.e. does not understand) the semantics used in the forwarding tables. In other examples, AF NW-TT 105 may send the forwarding tables without adapting the information in the forwarding table.

At 107, AF NW-TT 105 either sends the forwarding tables or, in examples where the information in the forwarding table has been adapted to 3GPP-specific information by AF NW-TT 105, sends the adapted 3GPP-specific information to Policy Control Function (PCF) 109.

At 111, PCF 109 either sends the forwarding tables or, in examples where the information in the forwarding table has been adapted to 3GPP-specific information by AF NW-TT 105, sends the adapted 3GPP-specific information to SMF 113.

SMF 113 can use the information from forwarding tables received at 111 to derive rules for mapping a TSN stream to a PDU session. For each destination Medium Access Control (MAC) address, forwarding table information received from CNC 101 at SMF 113 can be used to show which ingress and egress ports can be used to forward traffic to the destination MAC address. From this information, information as to which PDU session can be used by User Equipment 127 to correctly forward traffic to the destination MAC address.

Alternatively to using forwarding table information to determine information as to which PDU session can be used by User Equipment 127 to correctly forward traffic to the destination MAC address, SMF 113 can use the adapted 3GPP-specific information in examples where the information in the forwarding table has been adapted to 3GPP-specific information by AF NW-TT 105.

Furthermore, Virtual Local Area Network (VLAN) Identifiers (ID) associated to entries in the forwarding tables can be used by SMF 111 to provide filtering information for ingress and egress ports. In some examples, this can be used to determine if frames of a specific TSN stream should be forwarded via a specific port. For 5GS bridge systems this allows verification if frames from specific TSN streams should be transmitted using a specific PDU session. For example, for 5GS bridge systems this allows the selection of a PDU session for transmission of frames of a specific TSN stream.

Alternatively to using VLAN IDs in forwarding table information to determine the filtering information, SMF 113 can use the adapted 3GPP-specific information in examples where the information in the forwarding table has been adapted to 3GPP-specific information by AF NW-TT 105.

In some examples, SMF 113 can be used to derive rules for mapping TSN streams to QoS flows. For such mapping, TSN Priority Code Point (PCP) values can be used. SMF 113 can establish rules for mapping between TSN PCP values and 5GI (5G QoS Identifier) or QFI (QoS flow ID) values. In some examples, the TSN PCP values may be received in a header of one or more TSN streams.

At 115, SMF 113 can send mapping rules between TSN streams and PDU sessions and/or mapping rules between TSN streams and QoS flows to UE 127. These rules are received at UE 127 and can be stored at step 117. The rules may comprise QoS mapping rules and/or PDU mapping rules. An example of these rules is shown at 121.

When TSN streams are incoming to an ingress 125 of UE 127, UE 127 can apply the rules received from SMF 113 to map each TSN stream to a PDU session and/or to a QoS flow.

In the example shown in FIG. 1, multiple PDU sessions 135 and 137 are established at UE 127. Each PDU session may correspond to an (ingress, egress) port pair. As shown in FIG. 1, egress port 139 corresponds to PDU Session 1 and egress port 141 corresponds to PDU Session 2.

Each TSN stream can also be mapped to one of QoS flows 129, 131 or 133 using the mapping rules received from SMF 113.

Figure 2:
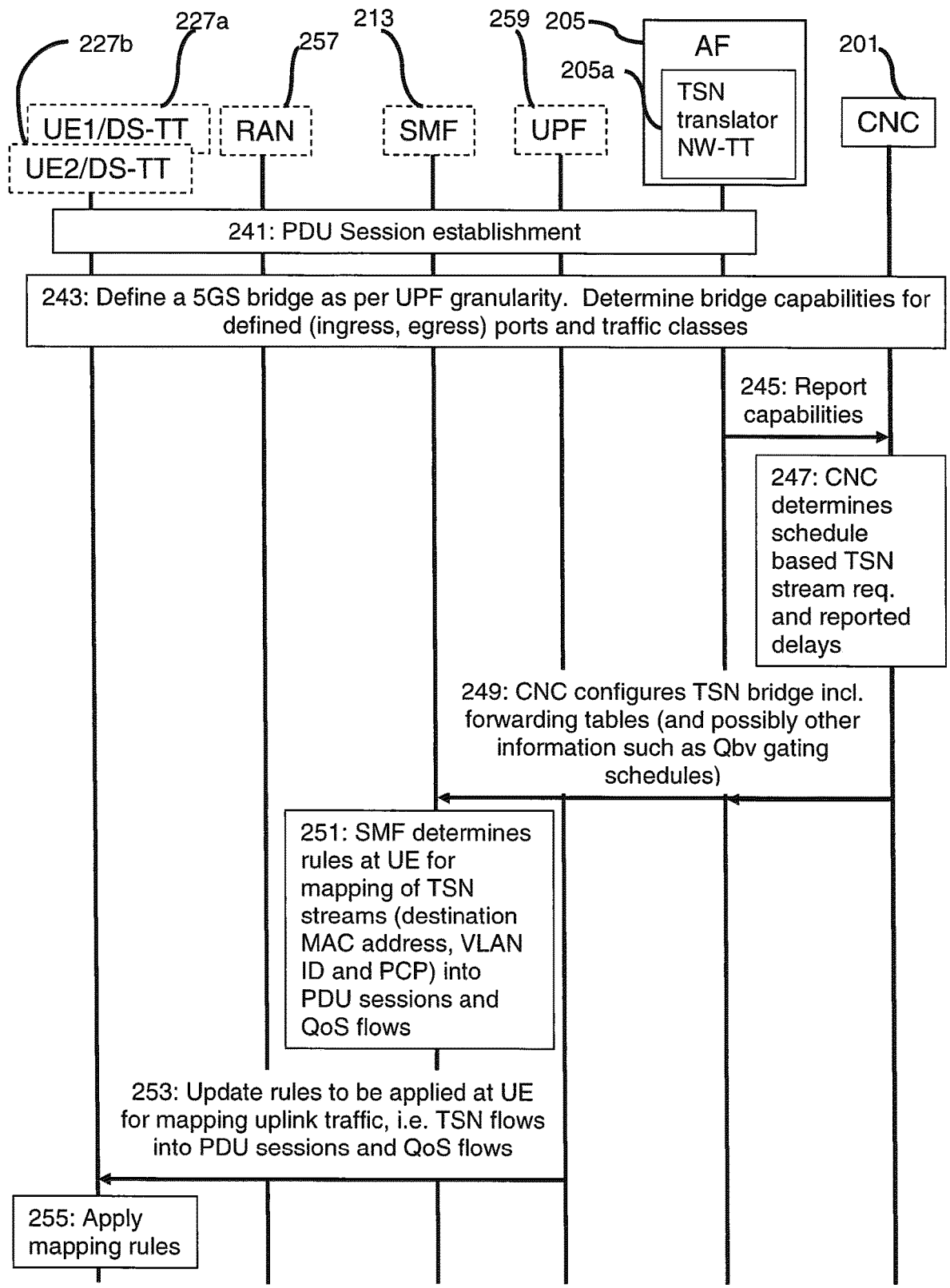
FIG. 2 shows a message flow diagram.

FIG. 2 shows an example of a message flow for deriving rules for mapping uplink TSN streams to PDU sessions and QoS flows at one or more UEs 227a, 227b.

The example message flow of FIG. 2 may take place in a network comprising 5GS and TSN functions.

At 241 one or more PDU sessions are established. The one or more PDU sessions may be established over the following exemplary entities: RAN 257; SMF 213; UPF 259; Application Function (AF) 205 and one or more UEs 227a, 227b. AF 205 may comprise a TSN translator (Network Side Translation Function) 205a.

At 243, 5GS bridge between the 5GS and TSN is defined as per UPF bridge granularity from the perspective of CNC 201. Bridge capabilities for defined (ingress, egress) ports and traffic classes may also be determined.

At 245, the bridge capabilities determined at 243 are reported by AF 205 to CNC 201. At 247, CNC 201 then determines a schedule based on TSN stream requirements. CNC 201 may also take into account any reported delays in the network at 247 when determining the schedule.

At 249, CNC 201 configures TSN bridges in the network. During step 249, CNC 201 sends forwarding tables to SMF 213. CNC 201 may also send the forwarding tables to AF 205. Other information such as Qbv gating schedules may be sent during this step.

The forwarding tables sent at 249 may comprise entry information. Entry information may comprise one or more of: a destination MAC address to which an entry's filtering information applies, an ingress port, one or more egress port(s), and a VLAN ID.

At 251, SMF 213 determines rules to be applied at one or more UEs 227a, 227b for mapping TSN streams into PDU sessions and/or QoS flows. These rules can be determined using one or more of a destination MAC address to which an entry's filtering information applies, an ingress port, one or more egress port(s), and a VLAN ID as described above in relation to FIG. 1.

At 253, the rules determined at SMF for mapping uplink traffic at one or more UEs 227a, 227b are sent to the one or more UEs 227a, 227b. These rules can then be used at 255 to map uplink traffic received at the one or more UEs 227a, 227b, for example to map incoming TSN streams to PDU sessions and/or QoS flows.

As described, for example in 3GPP TS 23.501 and 3GPP TS 23.502, it is possible to create multiple anchor UPFs for a single PDU session. Such additional PDU Session Anchors can be inserted in the data path of a PDU Session to create new data paths for the same PDU Session. In the case of PDU Sessions of, for example, type IPv4 or IPv6 or IPv4v6 or Ethernet, the SMF may decide to insert in the data path of a PDU Session a Uplink Classifier (UL CL). The UL CL is a functionality supported by an UPF that can be used to divert (locally) some traffic matching traffic filters provided by a SMF in a network. A SMF may decide to insert UL CL during or after PDU Session Establishment, or to remove UL CL after PDU Session Establishment. In some examples, a UE in the network is unaware of UL CL addition and removal.

In some examples, a PDU Session may be associated with multiple IPv6 prefixes. This is referred to as multi-homed PDU Session. In some examples, a multi-homed PDU Session provides access to a Data Network via more than one PDU Session Anchor. The different user plane paths leading to the different PDU Session Anchors branch out at a "common" UPF referred to as a UPF supporting "Branching Point" (BP) functionality. A BP provides forwarding of UL traffic towards the different PDU Session Anchors and can be used to merge DL traffic to the UE i.e. merging the traffic from the different PDU Session Anchors on a link towards the UE. The insertion and removal of a UPF supporting Branching Point is decided, in some example, by an SMF and is controlled by the SMF. Multi homing of a PDU Session applies for PDU Sessions of IPv6 type. When a UE requests a PDU Session of type "IPv4v6" or "IPv6" the UE also provides information to the network as to whether the UE supports a Multi-homed IPv6 PDU Session.

Figure 3:
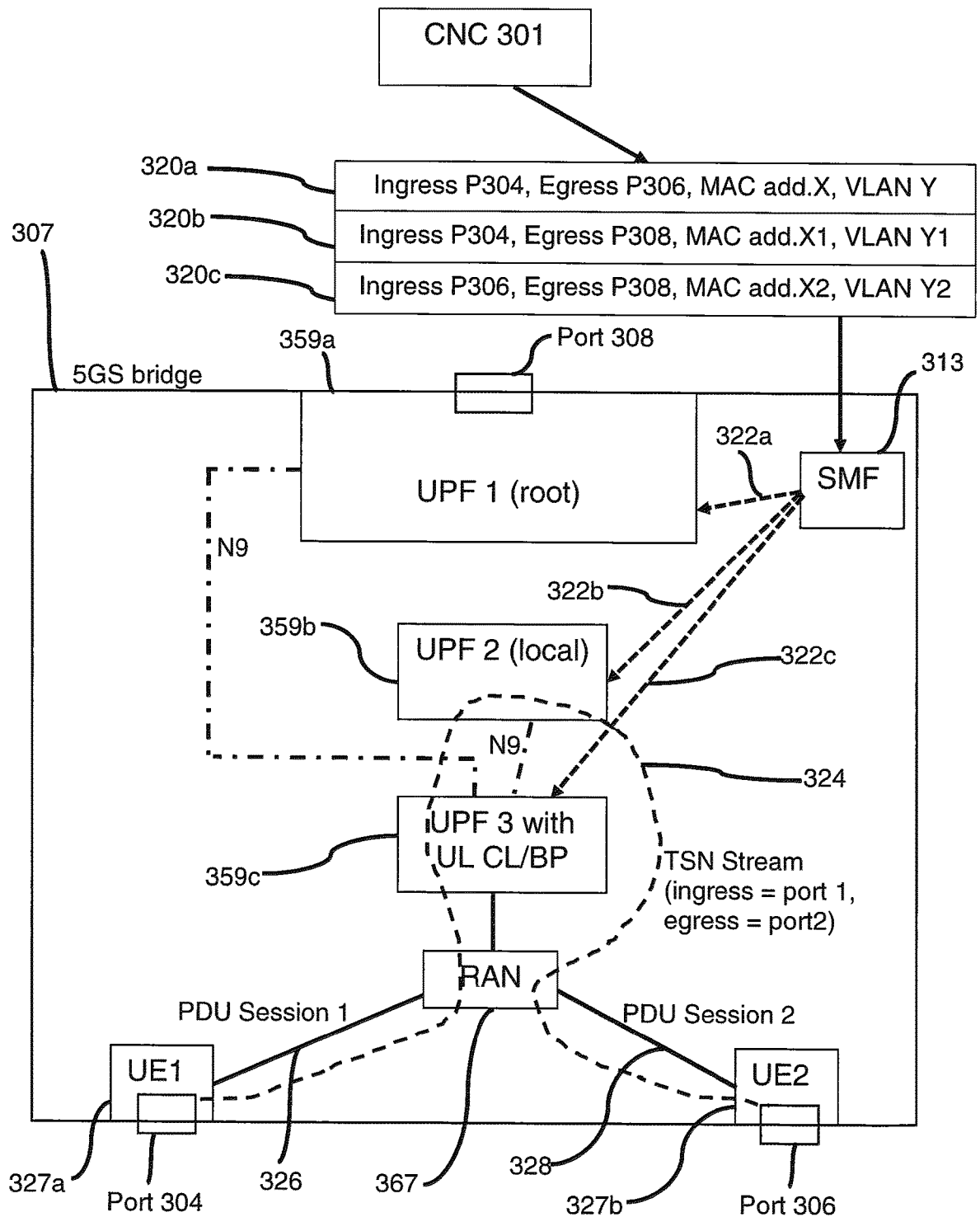
FIG. 3 shows a schematic representation of a method for mapping streams of data.

FIG. 3 shows an example of parts of a network comprising a 5GS bridge comprising a root UPF 359a, a local UPF 359*b* and UPF with UL CUBP 359*c*. The 5GS bridge 307 also comprises RAN 367, UE 327*a* and UE 327*b*.

In some examples, in order for one or more egress port(s) for a particular VLAN ID and destination MAC address to be reached a local UPF instance/anchor is required to be used.

In FIG. 3, the ports of 5GS bridge 307 that may be visible to CNC 301 are Port 304, Port 306 and Port 308.

UL CUBP functionality can be assigned to UPF 359*c* with forwarding rules 322*c* corresponding to the UL CUBP. Other forwarding rules 322*a* and 322*b* can be sent to UPF 359*a* and UPF 359*b* from SMF 313. At least some of the forwarding rules may be derived from entries 320*a*, 320*b* and 320*c*.

In the example of FIG. 3, egress port 306 for MAC address destination X is on UE 327*b* within 5GS bridge 307. In order for uplink traffic from UE 327*a* to be forwarded to the destination MAC address, the traffic can be forwarded as shown at 324 using PDU sessions 326 and 328 and UPF 359*c* in combination with UPF 359*b* as a local UPF anchor. As described with relation to FIG. 4 below, the local UPF anchor 359*b* will be configured by SMF 313 to perform the switching to the egress port 306 at UE 327*b*. Furthermore, the corresponding configuration of UL CL/BP at UPF 359*c* will be derived by SMF 313.

In some examples, UE 327*a* and UE 327*b* may be configured with IPv6 prefixes of PDU session anchor UPFs (local and/or root UPFs).

In some examples, TSN streams to be forwarded from Port 304 to Port 308 at the root UPF 359*a* (Port 308 is visible to CNC 301) can be put into the PDU session between UE1 327*a* and UPF 359*a*.

Figure 4:
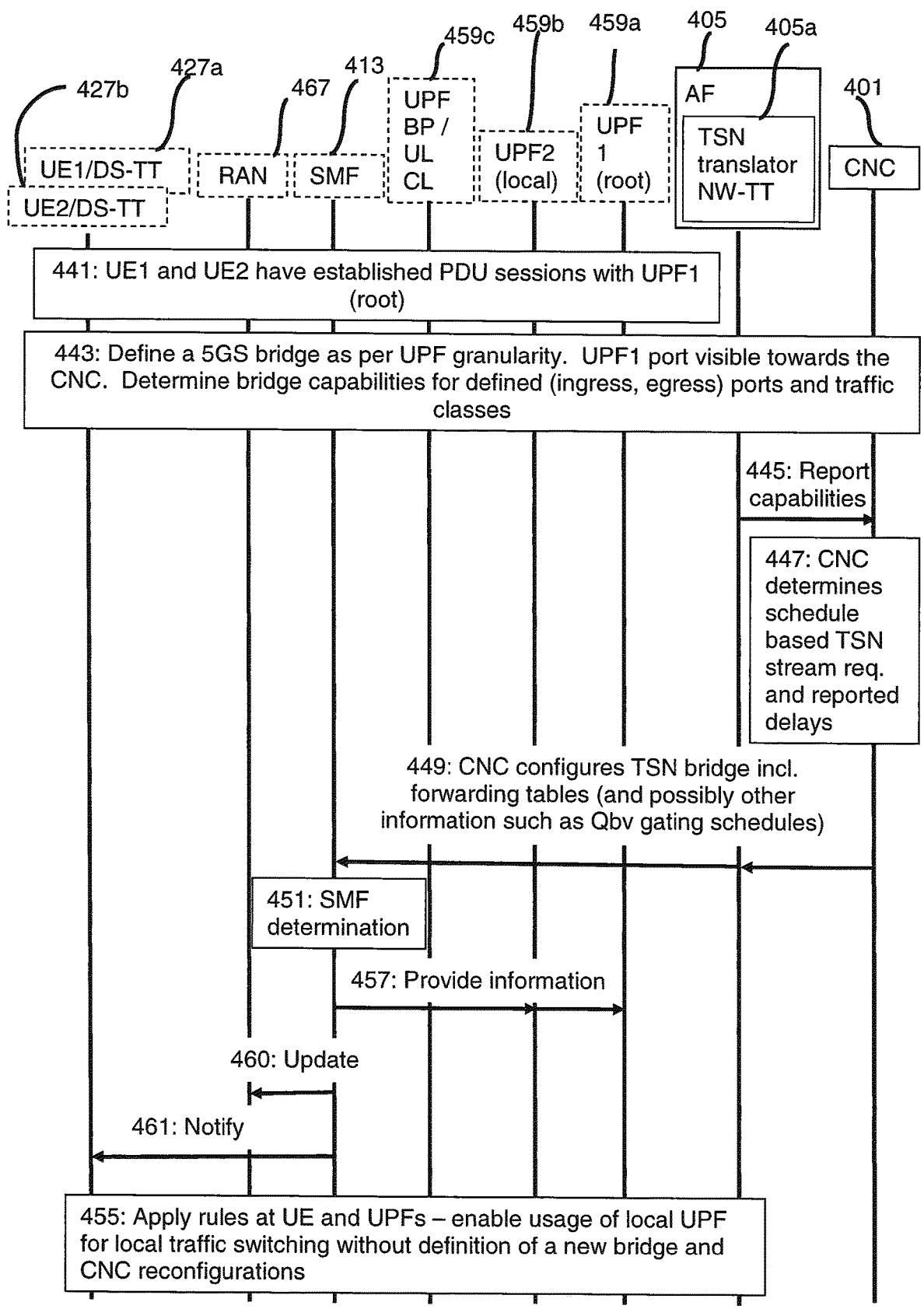
FIG. 4 shows a message flow diagram.

FIG. 4 shows an example message flow for using forwarding tables to derive rules for UL CUBP and to derive forwarding rules at a UE.

Steps 441, 443, 445 and 447 are analogous to steps 241, 243, 245 and 247 of FIG. 2.

At 441, UEs 427*a* and 427*b* have established PDU sessions with root UPF 459*a*. For example, each UE 427*a* and 427*b* may have established a single PDU sessions towards root UPF 459*a*.

At 443, the 5GS bridge is defined as having a per UPF granularity. As UE1 and UE2 both have a connected PDU session towards UPF1 459*a*, only one 5GS bridge is defined. The two established PDU sessions connect two ports at the UE 427*a*, 427*b* side with one port at the UPF side of the single 5GS bridge. Bridge capabilities for defined (ingress, egress) ports and traffic classes are also determined.

At 445, the determined bridge capabilities are reported by AF 405 to CNC 401. AF 405 may comprise TSN translator NW-TT 405*a*.

At 447, CNC 401 discovers the network topology as well as the capabilities of individual bridges in the network. CNC 401 also determines the schedules and configurations of bridges based on TSN stream requirements known at CNC 401. CNC 401 may also take into account any reported delays in the network at 447 when determining the schedule.

At 449, CNC 401 configures the 5GS bridge. A 5GS bridge may be considered to be a 5GS appearing as a TSN bridge. CNC 401 may also configure other bridges in the network in this step. In some examples, a mobile communication system may behave as a TSN bridge towards other entities in the TSN. In some examples, a 5GS bridge comprises a 5GS system behaving as a TSN bridge towards other entities in the TSN.

At 449, CNC 301 may configure the 5GS bridge with information such as forwarding tables. The forwarding tables may comprise information such as connectivity information between ingress and egress ports for specific destination MAC addresses, as well as VLAN IDs in some examples. In some examples, other information such as Qbv gating schedules is also configured in this step.

The information configured at 449 may arrive at SMF 413 after being sent over AF 405 and/or a PCF (which is not shown in FIG. 4) in the network.

At 451 SMF 413 can determine rules for mapping TSN streams at UEs 427*a*, 427*b* with specific destination MAC addresses, VLAN IDs and PCP into PDU sessions and QoS flows. Furthermore, SMF 343, which knows overall connectivity information for the 5GS bridge can also determine the possibility of local traffic break-out, using the UPFs 459*b* and 459*c* which are not visible towards the TSN. SMF 343 may be aware of all UPFs within the 5GS bridge, including those that not visible to CNC 401.

For example, in some situations, similarly to the situation shown in FIG. 3, a TSN stream may have an ingress port at a UE1 (427*a*) port and egress port at a UE2 (427*b*) port where the UE1 (427*a*) and UE2 (427*b*) can be reached within a 5GS bridge without forwarding to the DN. SMF 413 then selects UPF 459*b* that can serve as a local anchor and establishes a new PDU Session Anchor UPF 459*b*, "local UPF". Note that, in the case of IPv6 multi-homing PDU Session, SMF 413 can also allocate a new IPv6 prefix corresponding to UPF 459*b*. Furthermore, SMF 413 can establish a BP (in case of IPv6 multi-homing) or a UL CL for the PDU Session by selecting the UPF that is the most suitable to perform traffic branching given the ingress/egress port pairs that need to be connected (in FIG. 3, this corresponds to UPF 359*c*).

At step 457, SMF 413 provides information of uplink forwarding rules to root UPF 459*a* and local UPF 459*b*. The uplink forwarding rules may comprise, for example, tunnel information. The uplink forwarding rules may comprise, for example traffic filters for IPv6 prefixes (in the case of IPv6 multi-homing).

At step 460, SMF 413 updates RAN 467. This update may comprise. for example, new tunnel information corresponding to the UPF BP or UL CL 459*c*.

At step 461, SMF informs the one or more UEs 427*a* and 427*b* on the availability of the new IP prefix corresponding to local UPF 459*b*. SMF 413 sends to the one or more UEs 427*a* and 427*b* the routing rule along with the IPv6 prefix. This is done using an IPv6 Router Advertisement message as described in 3GPP TS 23.502, for example.

At 455, after the forwarding and/or routing rules are signalled towards UPFs 459*a*, 459*b* and 459*c*, UL CL/BP 459*c*, RAN 467 and UEs 427*a*, 427*b*, the frames will be forwarded accordingly, which in some examples avoids DN involvement. Furthermore, such changes within 5GS will not be visible towards TSN, i.e. additional 5GS bridges will not be visible by CNC 401. Consequently, no network re-configurations are needed. From the perspective of CNC 401 there is still one 5GS bridge per UPF (as CNC 401 cannot see UPF 459*b* and 459*c*).

Figure 5:
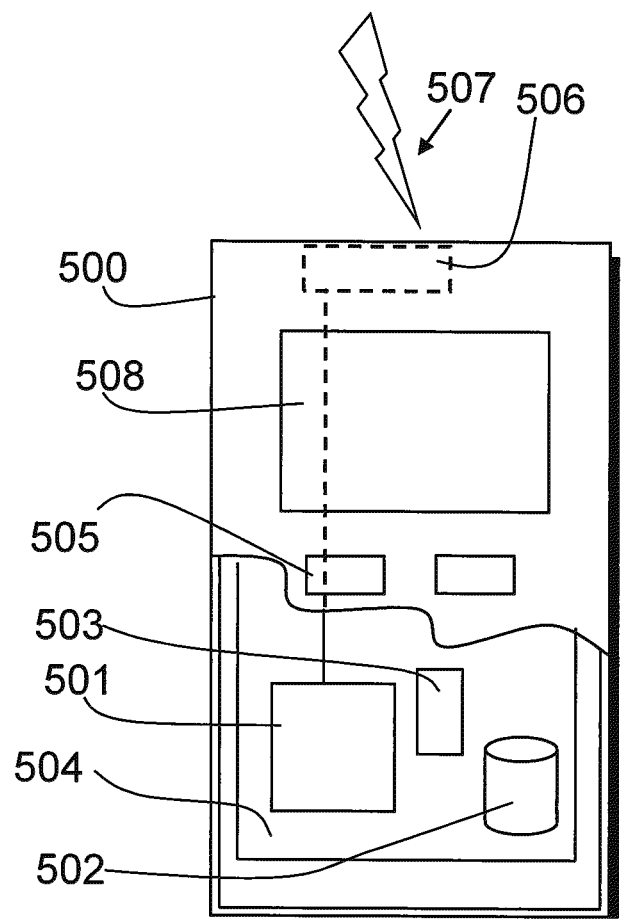
FIG. 5 shows a schematic representation of an apparatus according to an example.

A possible wireless communication device will now be described in more detail with reference to FIG. 5 showing a schematic, partially sectioned view of a communication device 500. Such a communication device is often referred to as a UE or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 500 may receive signals over an air or radio interface 507 via appropriate apparatus for receiving and may transmit signals via appropriate apparatus for transmitting radio signals. In FIG. 5 transceiver apparatus is designated schematically by block 506. The transceiver apparatus 506 may be provided for example by means of a radio part and associated antenna arrangement. The antenna arrangement may be arranged internally or externally to the wireless device.

A wireless device is typically provided with at least one data processing entity 501, at least one memory 502 and other possible components 503 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 504. The user may control the operation of the wireless device by means of a suitable user interface such as key pad 505, voice commands, touch sensitive screen or pad, combinations thereof or the like. A display 508, a speaker and a microphone can be also provided. Furthermore, a wireless communication device may comprise appropriate connectors (either wired or wireless) to other devices and/or for connecting external accessories, for example hands-free equipment, thereto. The communication devices 502, 504, 505 may access the communication system based on various access techniques.

Figure 6:
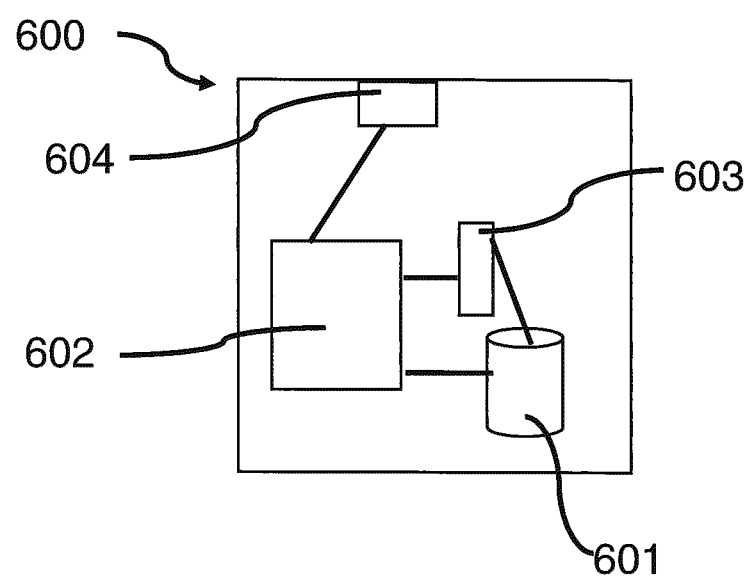
FIG. 6 shows a schematic representation of an apparatus according to an example.

FIG. 6 shows an example of a control apparatus 600 for a communication system, for example to be coupled to and/or for controlling a SMF, a scheduling entity such as a spectrum management entity, or a server or host, or an IAB or relay node. The apparatus 600 may be coupled to an SMF, or to a part of a UPF. The control apparatus may be integrated with or external to a node or module of a core network or RAN. In some example embodiments, base stations comprise a separate control apparatus unit or module. In other example embodiments, the control apparatus can be another network element such as a radio network controller or a spectrum controller. In some example embodiments, each base station may have such a control apparatus as well as a control apparatus being provided in a radio network controller. The control apparatus 600 can be arranged to provide control on communications in the service area of the system. The control apparatus 600 comprises at least one memory 601, at least one data processing unit 602, 603 and an input/output interface 604. Via the interface the control apparatus can be coupled to a receiver and a transmitter of the base station. The receiver and/or the transmitter may be implemented as a radio front end or a remote radio head. For example the control apparatus 600 or processor 601 can be configured to execute an appropriate software code to provide the control functions.

Figure 7:
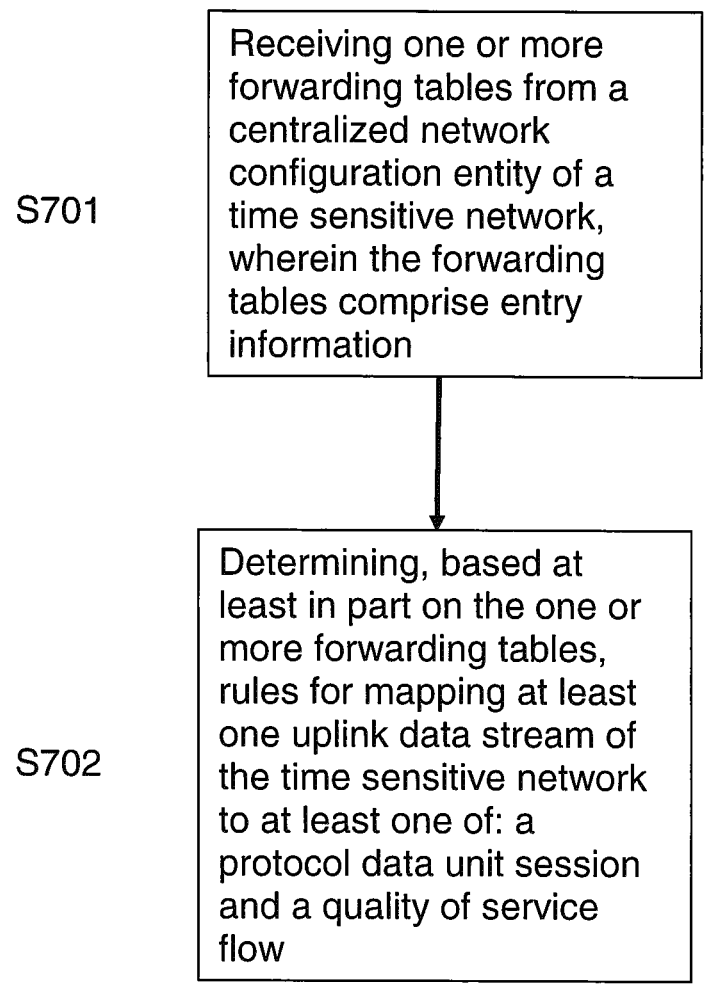
FIG. 7 shows a flow diagram of a method according to an example.

FIG. 7 is a flow chart of a method according to an example. The flow chart of FIG. 7 is viewed from the perspective of an apparatus such as SMF 113.

S701 of FIG. 7 comprises receiving one or more forwarding tables from a centralized network configuration entity of a time sensitive network, wherein the forwarding tables comprise entry information.

At S702, the method comprises determining, based at least in part on the one or more forwarding tables, rules for mapping at least one uplink data stream of the time sensitive network to at least one of: a protocol data unit session and a quality of service flow.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The example embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out example embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further exemplary embodiments comprising a combination of one or more exemplary embodiments with any of the other exemplary embodiments previously discussed.

The invention claimed is:

1. An apparatus, comprising:
   at least one processor; and
   at least one memory including computer program code, the at least one memory and computer program code being configured, with the at least one processor, to cause the apparatus to perform:
   receiving one or more forwarding tables from a centralized network configuration entity of a time sensitive network, wherein the forwarding tables comprise entry information, wherein the time sensitive network comprises a time sensitive network bridge, the time sensitive network bridge comprising at least one ingress network port and at least one egress network port, and wherein the entry information comprises a destination medium access control address to which filtering information of an entry applies, and a corresponding ingress port and egress port pair;
   determining, based at least in part on the one or more forwarding tables, rules for mapping at least one uplink data stream of the time sensitive network to at least one of: a protocol data unit session and a quality of service flow, wherein determining the rules for mapping comprises:
   determining, using the entry information, a protocol data unit session configured to map the uplink data stream, and
   determining a quality of service flow to map the uplink data stream to by using the entry information and at least one priority code point value received in at least one header of at least one data stream; and
   determining to insert or remove an uplink classifier and/or branching point for a protocol data unit session based at least in part on the entry information of the one or more forwarding tables,
   wherein the insertion or removal of the uplink classifier and/or the branching point causes network traffic at the user equipment to be forwarded via one or more user plane functions that are not visible to the time sensitive network.

2. The apparatus according to claim 1, wherein the entry information comprises a virtual local area network identifier.

3. The apparatus according to claim 1, wherein the at least one memory and computer program code are further configured, with the at least one processor, to cause the apparatus to perform sending the mapping rules to a user equipment such that the user equipment can use the mapping rules.

4. The apparatus according to claim 1, wherein the determining to insert or remove an uplink classifier and/or branching point for a protocol data unit session is further based at least in part on the entry information of the one or more forwarding tables and connectivity information regarding user plane functions that are not visible to the time sensitive network.

5. The apparatus according to claim 1, wherein the apparatus comprises a session management function.

6. The apparatus according to claim 1, wherein the apparatus is part of a mobile communication system that behaves as a time sensitive network bridge towards other entities in the time sensitive network.

7. A method, comprising:
   receiving one or more forwarding tables from a centralized network configuration entity of a time sensitive network, wherein the forwarding tables comprise entry information, wherein the time sensitive network comprises a time sensitive network bridge, the time sensitive network bridge comprises at least one ingress network port and at least one egress network port, and wherein the entry information comprises a destination medium access control address to which filtering information of an entry applies, and a corresponding ingress port and egress port pair;
   determining, based at least in part on the one or more forwarding tables, rules for mapping at least one uplink data stream of the time sensitive network to at least one of: a protocol data unit session and a quality of service flow, wherein determining the rules for mapping comprises:
   determining, using the entry information, a protocol data unit session configured to map the uplink data stream, and determining a quality of service flow to map the uplink data stream to by using the entry information and at least one priority code point value received in at least one header of at least one data stream; and determining to insert or remove an uplink classifier and/or branching point for a protocol data unit session based at least in part on the entry information of the one or more forwarding tables, wherein the insertion or removal of the uplink classifier and/or the branching point causes network traffic at the user equipment to be forwarded via one or more user plane functions that are not visible to the time sensitive network.

8. The method according to claim 7, wherein the entry information comprises a virtual local area network identifier.

9. The method according to claim 7, wherein the method comprises sending the mapping rules to a user equipment such that the user equipment can use the mapping rules.

10. The method according to claim 7, wherein the determining to insert or remove an uplink classifier and/or branching point for a protocol data unit session is further based at least in part on the entry information of the one or more forwarding tables and connectivity information regarding user plane functions that are not visible to the time sensitive network.

11. The method according to claim 7, wherein the method is performed by a session management function.

12. The method according to claim 7, wherein the method is performed by an apparatus which is part of a mobile communication system that behaves as a time sensitive network bridge towards other entities in the time sensitive network.

* * * * *